United States Patent [19]

Sumrall

[11] 3,893,679
[45] July 8, 1975

[54] HAND TRUCK STEP CLIMBER

[76] Inventor: Howell M. Sumrall, 4447 Marraco Dr., San Diego, Calif. 92115

[22] Filed: May 14, 1973

[21] Appl. No.: 360,400

[52] U.S. Cl. ............................ 280/5.3; 254/4 C
[51] Int. Cl. ............................................... B62b 5/02
[58] Field of Search .......... 280/5.3, 5.2, 5.24, 5.28, 280/5.32, 43.1, 43.17, 43.2, 47.2; 180/8 R, 8 A, 8 B, 8 AB; 254/4 C, 4 B, 4 R, 8 C, 164, 165

[56] References Cited
UNITED STATES PATENTS

| | | | |
|---|---|---|---|
| 1,570,607 | 1/1926 | Bashline | 254/164 |
| 2,616,720 | 11/1952 | Knoth | 280/5.3 X |
| 2,733,074 | 1/1956 | Fuglie et al. | 280/5.3 |
| 2,740,637 | 4/1956 | Cononelos | 280/5.3 |
| 2,834,602 | 5/1958 | Hanson | 280/5.3 |
| 3,578,353 | 5/1971 | Lockhart | 280/47.2 |

*Primary Examiner*—Leo Friaglia
*Assistant Examiner*—R. Schrecengost

[57] ABSTRACT

A hand truck step climber carried by a conventional hand truck behind the hand truck frame; an expansion spring coupled between the top of the supporting frame and the top of the hand truck frame; a cable coupled between the top of the supporting frame through a lifting winch to the bottom of the hand truck frame; and a lifting handle coupled to the lifting winch.

1 Claim, 6 Drawing Figures

Fig. 1

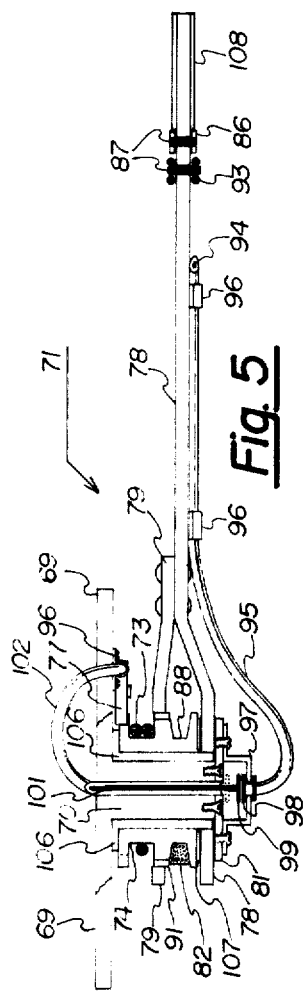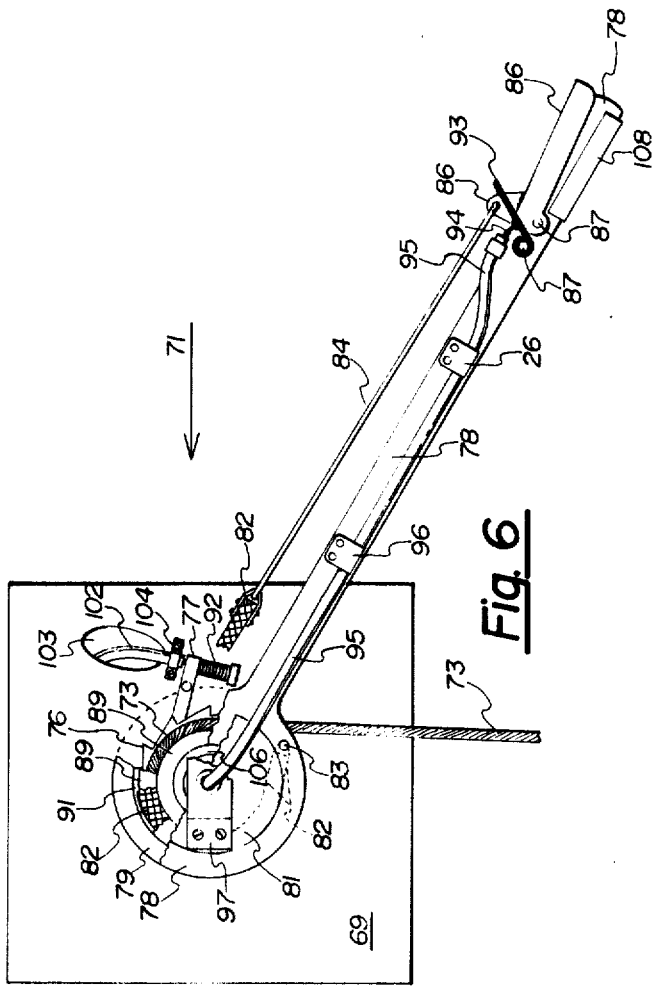

3,893,679

HAND TRUCK STEP CLIMBER

BRIEF DESCRIPTION OF THE INVENTION

The present invention relates to a hand truck step climber and more particularly to a hand truck step climber which can be added to a conventional hand truck.

According to the invention, the hand truck step climber is provided which consists of a frame with a pair of crutch-type legs. The frame being slideably coupled to the back of a conventional hand truck frame. The top of the lifting frame is coupled to the top of the hand truck frame via an expansion spring. The top of the lifting frame is also coupled to the bottom of the hand truck frame via a cable passing through a lifting winch. The lifting winch has a lifting arm extension whereby when engaged and raised, the winch is rotated effectively shortening the cable and lifting the hand truck portion with respect to the lifting frame. The entire mechanism is then tilted back so that the wheels of the hand truck contact the surface of the step and the handle released. The expansion spring will then pull the lifting frame back into position for the next lift.

An object of the present invention is the provision of a novel hand truck step climber.

Another object of the invention is the provision of a hand truck step climber that can be added to a conventional hand truck.

A further object of the invention is the provision of a hand truck step climber which is inexpensive to manufacture and install and extremely simple and convenient in operation.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein:

FIG. 4 is a side elevational view of another embodiment of the present invention;

FIG. 5 is a top view of the lifting mechanism of FIG. 4; and

FIG. 6 is a front elevational view of the lifting mechanism of FIG. 4.

DETAILED DESCRIPTION OF THE DRAWING

Figure 1:
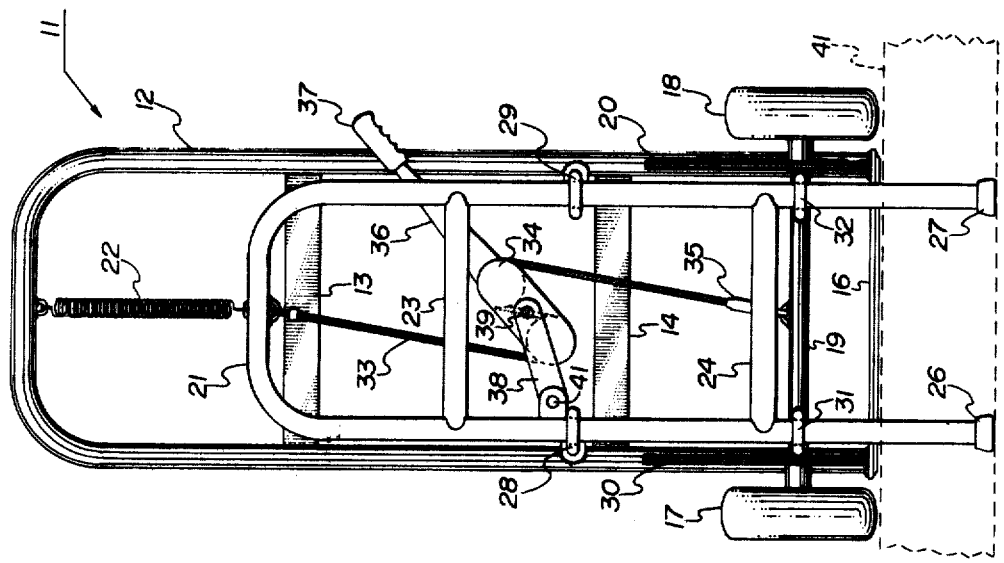
FIG. 1 is a front elevational view of the preferred embodiment of the present invention in the standby position.
Figure 2:
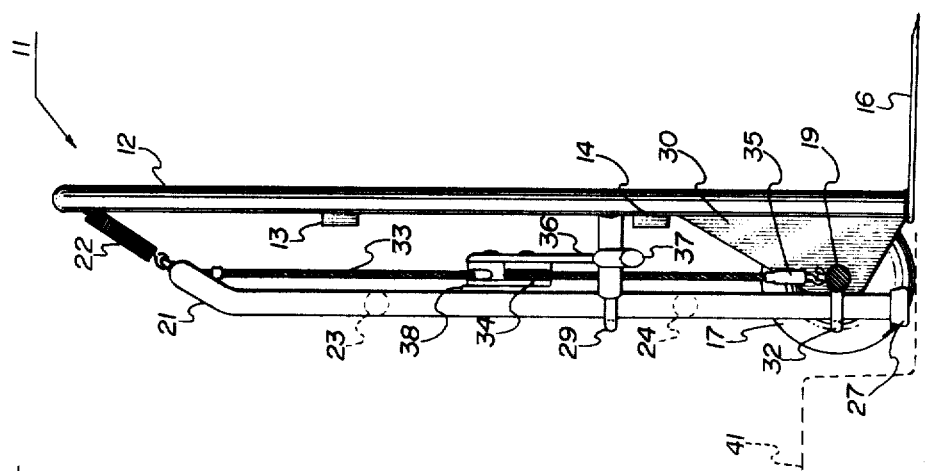
FIG. 2 is a side elevational view of the embodiment of FIG. 1.
Figure 3:
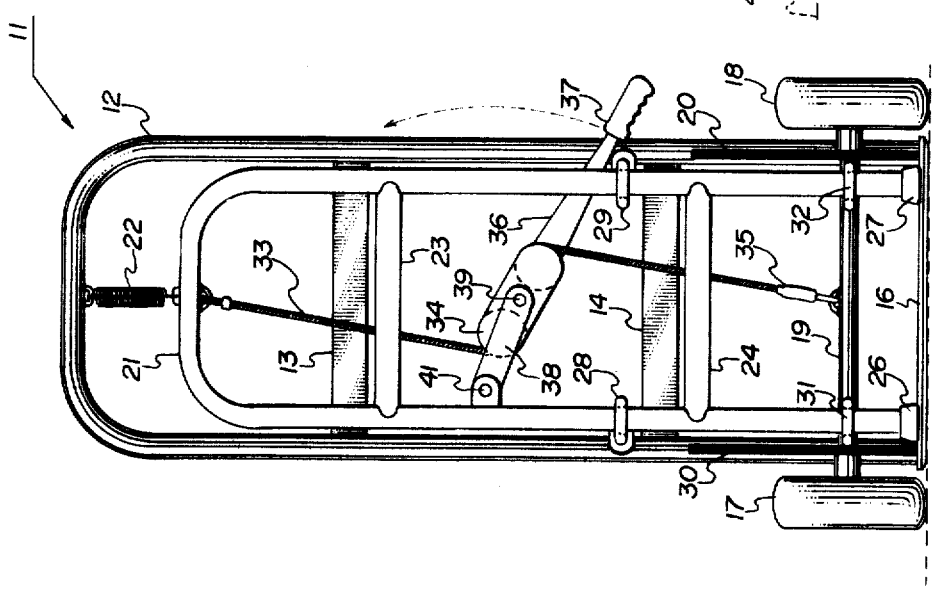
FIG. 3 is a front elevational view of the embodiment of FIG. 1 in the lift position.

Referring to FIGS. 1, 2 and 3, the entire combination is shown generally at 11 with a conventional hand truck having a frame 12 with support members 13 and 14 at an axle 19 with wheels 17 and 18 rotatably coupled thereto. The hand truck has a load platform 16. Stair-climber frame 21 is coupled to hand truck frame 12 via expansion spring 22. Cable 33 is coupled between the top of stair-climber frame 21 and axle 19 via lifting winch 34 and screw hook fitting 35 coupled to axle 19. Lifting winch 34 has a lifting arm extension 36 terminating in lifting handle 37. Lifting frame 21 is also slideably coupled to hand truck frame 12 via guide brackets 28 and 29 coupled directly to frame 12 and guide brackets 31 and 32 coupled to axle 19. Lifting winch 34 is pivotally coupled to link member 38 at 39 and link member 38 is pivotally coupled to bracket 41 on lifting frame 21. Brackets 20 and 30 carry axle 19.

The hand truck step climber illustrated in FIGS. 1 and 2 is shown in its idle position ready to move the hand truck onto stair 41. It is pointed out that FIG. 2 is partially broken away showing moving axle bracket 20 and wheel 18 to illustrate the sliding action of lifter frame 21 with respect to hand truck frame 12. As handle 37 is pulled in an upper position, stress is exerted on axle 19 via cable 33. This will lift the hand truck with respect to the hand truck step lifter as shown in FIG. 3 expanding expansion spring 22. When the hand truck wheels 17 and 18 are over step 41 the entire mechanism is pulled back until wheels 17 and 18 are positioned on step 41. At this time handle 37 is released allowing spring 22 to return climber frame 21 to the position shown in FIGS. 1 and 2.

Referring to FIGS. 4, 5 and 6, a multiple stroke ratchet version of the embodiment of FIGS. 1, 2 and 3 will be described. The embodiment is show generally at 51 having a main frame 52 with an upper back brace 53 and lower back brace 54 fixedly attached thereto. Loading platform 56 extends forward of main frame 52. A slide support 57 is coupled to main frame 52 and carries an upper slide ring 67. Wheel 58 is rotatably coupled to axle 59 which in turn is carried by axle bracket 60. Slide frame 61 is coupled to expansion spring 62. Upper cross tube 63 and lower cross tube 64 lends structural strength to slide frame 61. Slide frame wheel 66 is rotatably coupled to slide frame 61. Upper slide ring 67 and lower slide ring 68 slidably receive slide frame 61. Lifting mechanism mounting plate 69 is carried by slide frame 61 and mechanism support stud 70. The lift mechanism is shown generally at 71.

Swagged connector 72 is coupled to axle 59 and lift cable 73 which is wrapped around winch drum 74. Winch drum 74 is held by a ratchet 76 which is engaged by pawl 77. Lift cable 73 can be wound by counter wound on winch drum 74 by counter clockwise rotation of winch drum 74 as viewed in FIG. 6. Drum 74 is rotated by lift arm 78 which with a lift arm doubler 79 rotatably encircled lift mechanism 71 and is retained by a retainer plate bearing 81. A clutch belt 82 passes between retainer plate bearing 81 and lift mechanism 71 and is attached by clutch pin 83. The opposite end of clutch belt 82 is attached by a clutch rod 84 to a clutch lever handle 86 which can be gripped and rotated around lever pivot 87 to tighten clutch belt 82 within a belt groove 88 which is located in an outer zone of mechanism spindle 89. Mechanism spindle 89 also contains winch drum 74 ratchet 76 and a lift arm bearing 91. As lift arm 78 is lifted from the position shown in FIG. 6 with clutch bolt 82 tightened, ratchet 76 rotates counter clockwise and pawl 77 will pass over the teeth of ratchet 76 being biased against ratchet 76 by pawl spring 92. This rotation effectively shortens lift cable 73 and lifts axle 59 and the main frame 52 along slide frame 61 until wheel 58 clears the level of step 41. In this situation, the hand truck 51 can be rolled on slide tube wheel 66 toward the step riser of step 41 and weight tilted back on wheel 58 which now lies above step 41.

To release the ratchet 76 and lift cable 73, thumb lever 93 is pressed away from the position shown in FIG. 3 which pushes movable push cable 94 through a movable sheath 95. Movable sheath 95 is held captive to lift arm 78 by sheath clamps 96 and rotatably captive to push cable bridge 97. Movable slip disk 98 is attached to movable push cable 94 and rotatably contacts static slip disk 99 which is attached to static push cable 101. Static push cable 101 moves through static sheath 102. Static sheath 102 passes through aperture 103 in mechanism plate 69 and is held captive by ratchet sheath clamp 104. Ratchet sheath clamp 104 positions static push cable 101 to impinge upon and release pawl 77 when thumb lever 93 is depressed. Mechanism spindle 89 is rotated counter clockwise to allow pawl 77 to escape. Sleeve bearing 106 allows mechanism spindle 89 to rotate smoothly around mechanism support stud 70. Washer bearing 107 allows smooth rotation against lift arm 78. Handle doubler 108 provides greater operator comfort.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A hand truck step climber mechanism comprising:
   a standard hand truck having a frame, an axle and a pair of wheels rotatably coupled to the axle together with a loading platform coupled to the bottom portion of the frame;
   a lifting frame slideably coupled to said hand truck frame and disposed behind the hand truck on the opposite side of the lifting platform;
   an expansion spring coupled between said lifting frame and the top of said hand truck frame;
   a cable coupled between the top of said lifting frame and said hand truck axle through a lifting winch, said lifting winch being rotatably coupled to said lifting frame; and
   a lifting arm coupled to said lifting winch for pivoting said lifting winch and effectively shortening the length of said cable whereby said standard hand truck is lifted with respect to said lifting frame.

* * * * *